Oct. 24, 1967  R. C. FISCHER  3,348,504
CELL-LESS PLANTER

Filed May 28, 1965  2 Sheets-Sheet 1

INVENTOR
RAYMOND C. FISCHER
BY J.K.McNeil
ATT'Y.

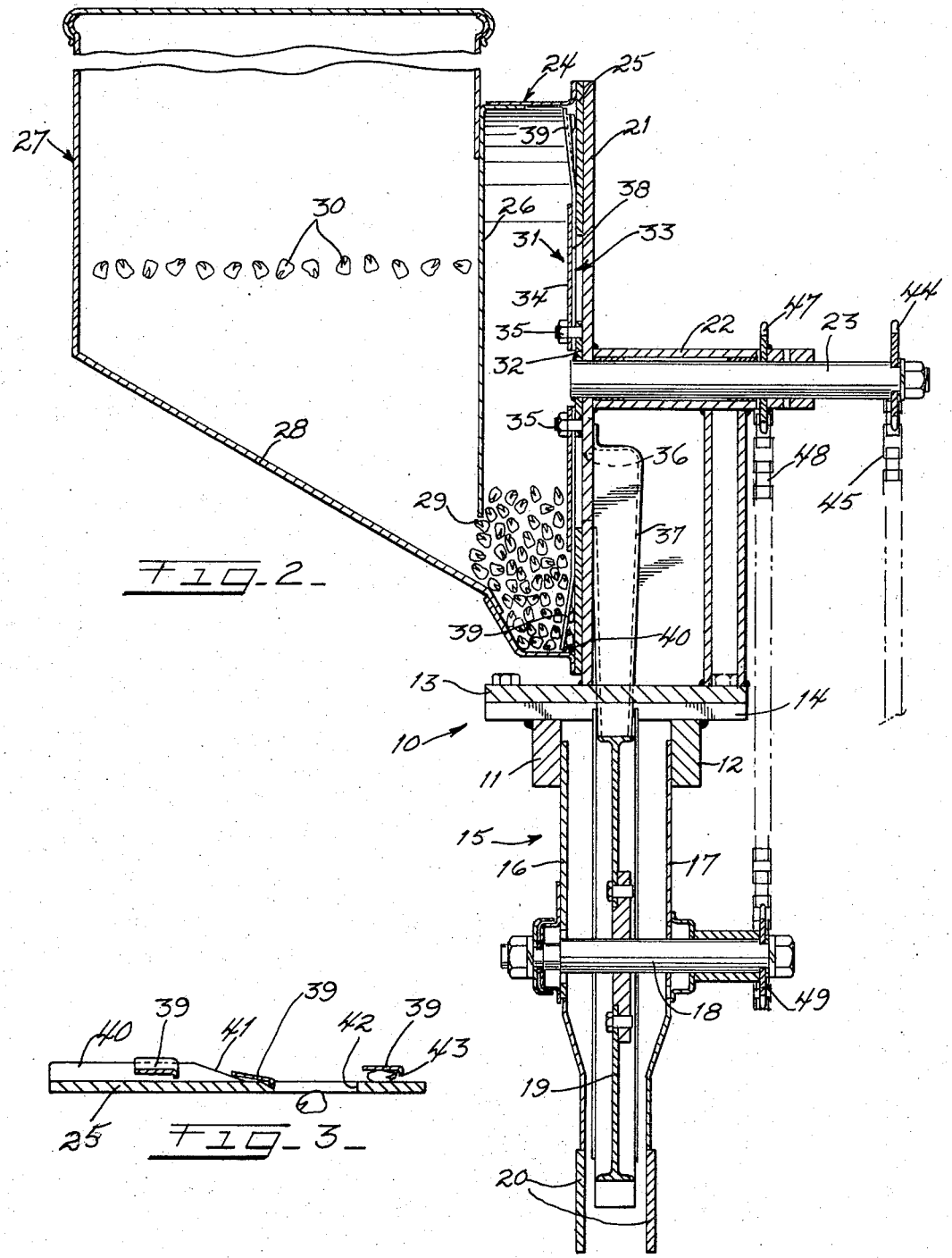

United States Patent Office 3,348,504
Patented Oct. 24, 1967

3,348,504
CELL-LESS PLANTER
Raymond C. Fischer, Hinsdale, Ill., assignor to International Harvester Company, Chicago, Ill., a corporation of Delaware
Filed May 28, 1965, Ser. No. 459,832
9 Claims. (Cl. 111—34)

ABSTRACT OF THE DISCLOSURE

In order to select seeds from a planter hopper irrespective of their size and convey them individually to the ground, a vertical seed wheel is rotatably mounted in communication with the seed and having axially projecting spring fingers biased toward the plane of the wheel. A stationary backing plate is provided with cam means engageable with the spring fingers as the seed wheel revolves, deflecting the fingers and releasing them when a seed is received therebetween and the base plate to hold the seed until it reaches a discharge point during rotation of the seed wheel.

---

This invention relates to agricultural implements and particularly to planters. More specifically, the invention concerns novel seed selecting and discharging means for a planter.

Conventional planters are designed for planting seed of uniform size, and where a seed plate is revolved in a seed hopper the cells in the plate conform to the size and shape of the seed to be planted. For example, where corn is to be planted, the seed cells in the plate conform to the size and shape of the kernels, and when a different crop is involved, another plate having a different cell size and shape must be utilized. Furthermore, the seed cells in a conventional plate do not always fill efficiently, and for planting corn the seed must be graded to fit the cells, whereas economies could be affected were it possible to use ungraded kernels.

Therefore, an object of this invention is the provision of a novel planting mechanism which efficiently selects seed and discharges it to the furrow irrespective of the size and shape of the seed.

Another object of the invention is the provision of a seed wheel or plate of novel and economical construction wherein a portion of the wheel revolves in the seed, and spring fingers or the like are utilized to pinch and hold a seed until it is delivered to a discharge outlet.

Other objects and advantages of the invention will become clear from the following detailed description when read in conjunction with the accompanying drawings wherein:

FIGURE 2 is a sectional view taken on the line 2—2 of FIGURE 1; and

FIGURE 3 is an enlarged section taken on the line 3—3 of FIGURE 1.

Figure 1:
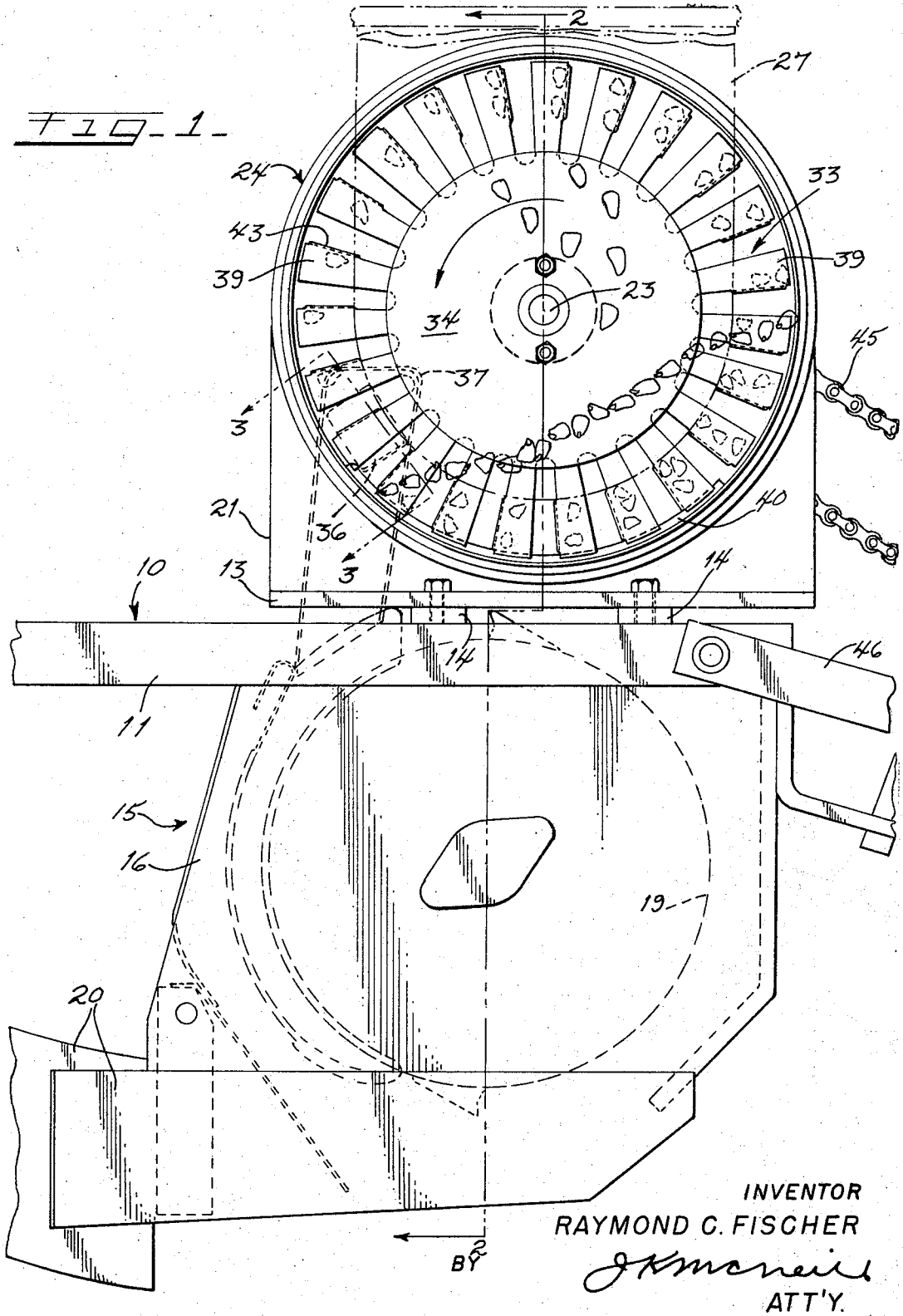
FIGURE 1 is a view in side elevation showing a planter incorporating the features of this invention.

Referring to the drawings, the numeral 10 designates a planter frame comprising laterally spaced bars 11 and 12 to which is secured a plate 13 separated from the bars by spacers 14. The bars 10 and 11 are adapted for connection to a tractor for propelling the planter assembly over the ground and support a boot 15 comprising spaced plates 16 and 17 in which is journalled a shaft 18 upon which is mounted a hill-drop wheel 19. The details of construction of the discharge mechanism in boot 15 including wheel 19 form no part of the present invention and are fully set forth in co-pending U.S. application, Ser. No. 411,180, filed Nov. 9, 1964, now Patent No. 3,320,909.

Earth-penetrating tool 20 is carried at the lower ends of plates 16 and 17 to form a furrow in which is deposited seed discharged from the wheel 19.

Affixed to plate member 13 is an upright 21 having affixed thereto a bearing sleeve 22 in which is rotatably mounted a shaft 23.

A cylindrical housing member 24 is mounted on a base plate 25 affixed to upright 21 and has a wall 26 spaced from and parallel to base plate 25 and forming one wall of a seed hopper 27 secured to the housing 24. The lower end of wall 26 terminates short of the bottom 28 of the hopper, forming therewith a side discharge opening 29. Bottom 28 is inclined and seed 30 in the hopper is fed through opening 29 into housing 24.

A seed wheel 31 is rotatably mounted in housing 24 and comprises a hub member 32 affixed, as by welding, to the inner end of shaft 23, a seed plate or wheel 33, made of spring steel or the like, and a reinforcing plate 34, secured to hub 32 and plate 33 by bolts 35. Seed wheel 31 revolves in housing 24, and its lower peripheral portion passes through the seed accumulated in the housing. Individual seeds are selected and discharged one at a time through an opening in base plate 25 and through a discharge outlet 36 in upright 21 into a seed spout 37 from which it passes downwardly to the wheel 19 to be deposited thereby in the furrow. For this purpose, seed plate 33 has a central section 38 and is provided with serrations on its periphery in the form of relatively long fingers 39 stamped from the same piece of spring steel as section 38 and being preferably normally disposed in approximately the same plane as the hub section.

An arcuately-shaped cam member 40 is affixed to and projects inwardly from the surface of base plate 25, preferably near the periphery of seed plate 33, and has a bevelled leading edge 41, shown in FIGURE 3, engageable with the fingers 39 to axially deflect them for a portion of the cycle of rotation of plate 38, as indicated at the bottom of housing 24 in FIGURE 2.

The fingers 39 are thus successively deflected during passage of the wheel 31 through the seed 30 so that, when the fingers 39 successively leave the cam 40, one or more of the kernels 30 have become pinched between each finger 39 and base plate 25, by virtue of the bias of fingers 39 to return to the normal plane of seed plate 33. Upon passage of the fingers over outlet 42 in base plate 25 and outlet 36 in upright 21 the seed passes into seed spout 37.

Although cam 40 may be mounted at other locations on base plate 25 for engagement with a radially inner portion of fingers 38, the fingers are shown as being flattened at their outer ends for engagement with the cam but provided with a flange portion 43 on the receding edge of each finger to prevent escape of seed from the finger during rotation of the seed wheel.

As shown in the drawings, the fingers 39 are relatively elongated and may accumulate two or more seeds therebetween and the base plate. However, due to the angle of deflection of the finger, as indicated in FIGURE 2, normally only the innermost seed will be retained and discharged through base plate outlet 42. All other seeds carried from the seed supply by the fingers fall back to the supply usually at the top of the rotational cycle and before the fingers reach the discharge outlet 42, as indicated by falling seeds in FIGURE 1. Thus, the single pinched seed is discharged and individual seed selection with a high degree of reliability is accomplished. In contrast, if the fingers were shorter so as to retain one seed in the supply, losing it as the finger emerges from the supply would result in a skip in the planting pattern.

For driving the seed shaft 23, a sprocket wheel 44 is mounted on the outer end thereof and drivingly connected by a chain 45 with a conventional ground wheel, not shown, carried by supports 46 pivoted to frame 10. Drive is transmitted from shaft 23 through a sprocket wheel 47 and chain 48 to another sprocket wheel 49 mounted on shaft 18 for driving wheel 19.

As indicated in FIGURE 3, the spring action of fingers 39 causes them to discharge the seed kernels with sufficient force to carry them through the outlets 42 and 36 into the seed tube 37. As pointed out hereinbefore, the seed kernels need not be of a uniform size, since the fingers 39 will hold and discharge a single seed of any size capable of being pinched between the finger and the base plate.

It is believed that the construction and operation of the novel precision seed selecting and planting mechanism of this invention will be clearly understood from the foregoing description. It should likewise be understood that the invention has been described in its preferred embodiment only, and that modifications may be made therein without departing from the spirit of the invention or the scope of the appended claims.

What is claimed is:

1. In a planter having a frame and a seed hopper mounted on the frame, a relatively stationary plate mounted on the frame in communication with the hopper and in contact with the seed, a seed wheel mounted on the frame for rotation parallel to said plate in the path of said seed, including a hub section and radially projecting axially yieldable fingers having a bias toward said plate, axially projecting actuating means carried by the plate engageable with said fingers during a portion of the path of rotation of the wheel to deflect said fingers sufficiently to accommodate a seed between the deflected fingers and the plate, each of said fingers being biased toward the plate after rotation of the wheel beyond said actuating means to hold said seed between the finger and the plate.

2. In a planter having a frame and a seed hopper mounted on the frame, a relatively stationary plate mounted on the frame in communication with the hopper and in contact with the seed, a seed wheel mounted on the frame for rotation parallel to said plate in the path of said seed, including a hub section and radially projecting axially yieldable fingers having a bias toward said plate, axially projecting actuating means carried by the plate engageable with said fingers during a portion of the path of rotation of the wheel to deflect said fingers sufficiently to accommodate a seed between the deflected fingers and the plate, each of said fingers being biased toward the plate after rotation of the wheel beyond said actuating means to hold said seed between the finger and the plate, and a discharge outlet formed in said plate registrable with successive of said fingers during rotation of the wheel for the discharge of seed held by the fingers.

3. The invention set forth in claim 1, wherein said wheel is stamped from a single sheet of spring steel.

4. The invention set forth in claim 3, wherein the trailing edge of each of said fingers is turned downwardly to form a flange adapted to prevent dislodgment of seed therefrom prior to discharge of seed through said outlet.

5. The invention set forth in claim 4, wherein said wheel is in engagement with the adjacent face of said plate.

6. The invention set forth in claim 1, wherein said fingers are relatively elongated sufficiently to receive therebetween and said plate a plurality of radially spaced seeds.

7. The invention set forth in claim 1, wherein said actuating means is an arcuately shaped cam concentric with the axis of said wheel and engageable with said fingers.

8. In a planter having a frame and a seed hopper mounted on the frame, a relatively stationary plate mounted on the frame in communication with the hopper and in the path of seed flowing therefrom, a seed wheel rotatably mounted on the frame parallel to said plate and formed of spring steel material having a hub section and a serrated peripheral portion forming relatively long fingers axially deflectable and having a bias toward said plate, cam means carried by said plate concentric with said wheel adjacent the outer periphery of said fingers and projecting axially from the plate for a portion of its circumference, said cam being engageable with said fingers during rotation of the wheel to deflect the fingers and accommodate passage of seed between the plate and said fingers, said fingers being biased toward the plate and adapted to hold a seed between each finger and the plate upon movement of the finger out of engagement with the cam, and an outlet in said plate registrable with successive of said fingers during rotation of the wheel for the discharge of seed from the fingers.

9. The invention set forth in claim 8, wherein an opening is provided in the lower portion of the hopper wall to allow seed to flow laterally outwardly therefrom, and said wheel is mounted in a vertical housing communicating with and receiving seed from said opening, said wheel being rotatable on a horizontal axis with its lower portion disposed in the seed.

No references cited.

ABRAHAM G. STONE, *Primary Examiner.*

R. C. HARRINGTON, *Assistant Examiner.*